United States Patent
Rosenau et al.

(10) Patent No.: US 9,909,433 B2
(45) Date of Patent: Mar. 6, 2018

(54) AIRCRAFT GAS TURBINE HAVING A BOOSTER BLEED DUCT IN A STATOR VANE ROOT ELEMENT OF A BYPASS DUCT

(71) Applicant: Rolls-Royce Deutschland Ltd & Co KG, Blankenfelde-Mahlow (DE)

(72) Inventors: Knut Rosenau, Herzfelde (DE); Lars Pettersson, Berlin (DE); Lutz Bilger, Birkenhain (DE); Andrew Cox, Berlin (DE)

(73) Assignee: ROLLS-ROYCE DEUTSCHLAND LTD & CO KG, Blakenfelde Mahlow (DE)

( * ) Notice: Subject to any disclaimer, the term of this patent is extended or adjusted under 35 U.S.C. 154(b) by 644 days.

(21) Appl. No.: 13/859,300

(22) Filed: Apr. 9, 2013

(65) Prior Publication Data
US 2013/0276453 A1 Oct. 24, 2013

(30) Foreign Application Priority Data
Apr. 10, 2012 (DE) .......................... 10 2012 007 130

(51) Int. Cl.
*F02C 9/18* (2006.01)
*F01D 9/04* (2006.01)
(Continued)

(52) U.S. Cl.
CPC .................. *F01D 9/04* (2013.01); *F02C 9/18* (2013.01); *F02K 3/04* (2013.01); *F02K 3/075* (2013.01)

(58) Field of Classification Search
CPC ...... F02C 6/08; F02C 7/18; F02C 9/18; Y02T 50/675; F04D 27/0207; F04D 27/023;
(Continued)

(56) References Cited

U.S. PATENT DOCUMENTS

| 4,463,552 A | 8/1984 | Monhardt et al. |
| 5,248,240 A * | 9/1993 | Correia ...................... 415/209.1 |

(Continued)

FOREIGN PATENT DOCUMENTS

| DE | 60220737 | 3/2008 |
| EP | 0902179 | 3/1999 |

(Continued)

OTHER PUBLICATIONS

German Search Report dated Feb. 8, 2013 from counterpart application.

(Continued)

*Primary Examiner* — Craig Kim
(74) *Attorney, Agent, or Firm* — Shuttleworth & Ingersoll, PLC; Timothy J. Klima

(57) ABSTRACT

An aircraft gas turbine has a core engine and a bypass duct surrounding the latter, where the core engine includes in its inflow zone a booster, in the area of which at least one booster bleed duct is provided for supplying an airflow from the booster into the bypass duct, and a stator vane row arranged in the bypass duct downstream of a fan. A vane root of the stator vane is designed as a structural element mounting the core engine, and the booster bleed duct is provided inside the vane root and issues downstream of the stator vane into the bypass duct.

7 Claims, 4 Drawing Sheets

Figure 1:
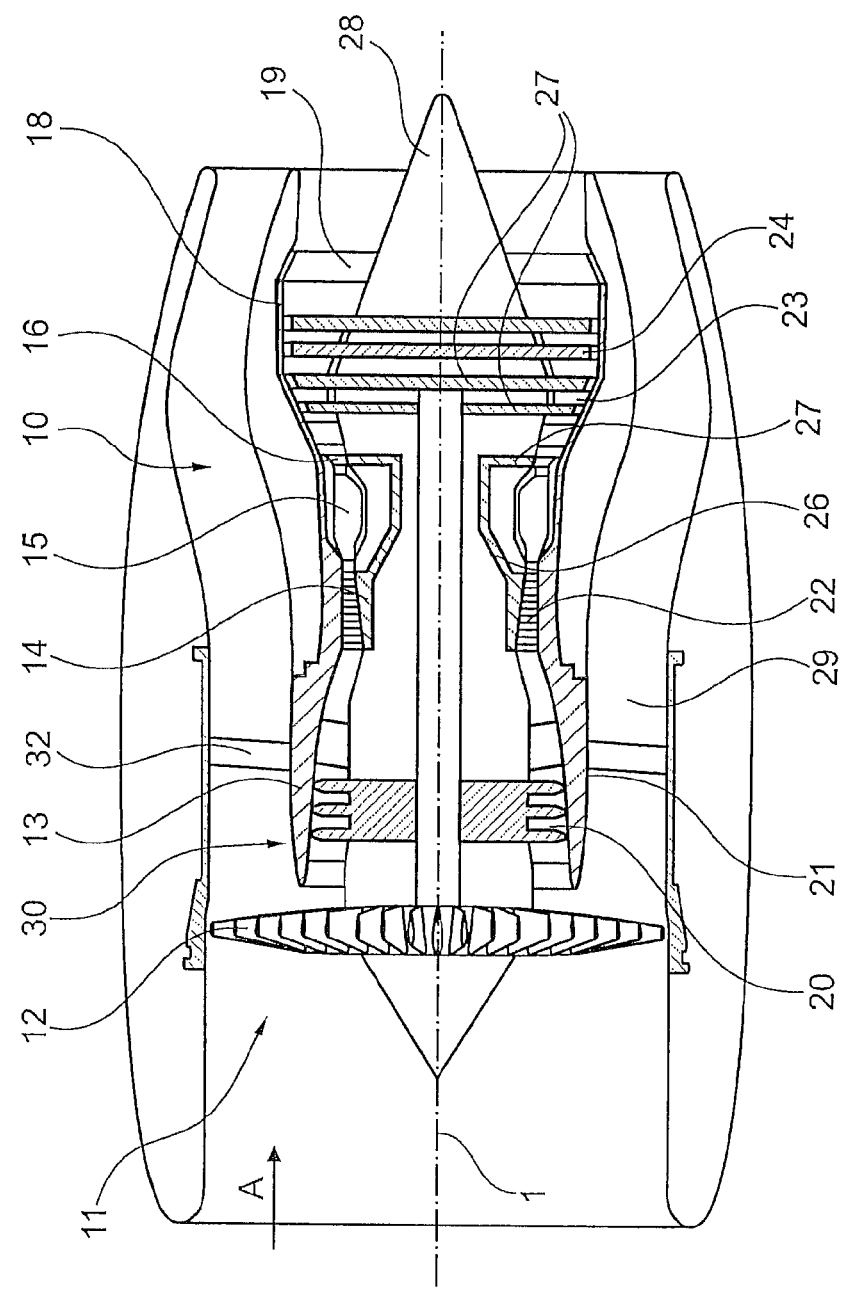

(51) Int. Cl.
*F02K 3/04* (2006.01)
*F02K 3/075* (2006.01)

(58) Field of Classification Search
CPC ... F01D 9/04; F01D 9/065; F01D 9/06; F02K 3/04; F02K 3/075
See application file for complete search history.

(56) References Cited

U.S. PATENT DOCUMENTS

| | | | |
|---|---|---|---|
| 5,279,109 A * | 1/1994 | Liu | F02C 7/052 |
| | | | 60/39.092 |
| 6,622,475 B2 | 9/2003 | Brault et al. | |
| 7,785,066 B2 | 8/2010 | Bil et al. | |
| 8,075,246 B2 | 12/2011 | Albert et al. | |
| 2003/0079465 A1 | 5/2003 | Beutin et al. | |
| 2005/0106009 A1* | 5/2005 | Cummings et al. | 415/145 |
| 2014/0234080 A1* | 8/2014 | Mojem | F02C 9/18 |
| | | | 415/144 |

FOREIGN PATENT DOCUMENTS

| | | | |
|---|---|---|---|
| FR | 2926328 A1 | 7/2009 | |
| FR | 2926337 A1 * | 7/2009 | F01D 9/041 |
| WO | 2008/147260 | 12/2008 | |

OTHER PUBLICATIONS

European Search Report dated Sep. 21, 2017 for counterpart European Application No. 13001834.4.

* cited by examiner

AIRCRAFT GAS TURBINE HAVING A BOOSTER BLEED DUCT IN A STATOR VANE ROOT ELEMENT OF A BYPASS DUCT

This application claims priority to German Patent Application No. DE102012007130.2 filed Apr. 10, 2012, the entirety of which is incorporated by reference herein.

This invention relates to an aircraft gas turbine having a booster bleed duct in a stator vane root element of a bypass duct. In detail, the invention relates to an aircraft gas turbine having a core engine and a bypass duct surrounding the latter, where the core engine includes in its inflow zone a booster, in the area of which at least one booster bleed duct is provided for supplying an airflow from the booster into the bypass duct, and with a stator vane row arranged in the bypass duct downstream of a fan.

Designs are known from the state of the art in which stator vanes are arranged in the bypass duct downstream of the fan in order to route and improve the flow through the bypass duct. The actual mounting of the core engine is then achieved using additional struts arranged downstream of the stator vanes, said struts extending radially through the bypass duct and forming part of a supporting structure for the core engine.

In designs of this type, it may prove to be disadvantageous that the struts impair the flow into the bypass duct and hence reduce the overall efficiency of the aircraft gas turbine. A further drawback of the designs already known is that the booster bleed duct is arranged for design reasons downstream of the stator vanes but upstream of the struts (structural elements). On the one hand this requires a sufficient axial construction length, and on the other hand it leads to complex designs which are unfavourable as regards costs and which cannot always be optimally designed as regards the flow.

It was proposed in the state of the art to design the stator vanes themselves as load-bearing elements for mounting of the core engine, so that they form structural ribs or struts. The stator varies therefore support the structural loads too in a design of this type. It has proven to be disadvantageous here that the bypass duct intersects the load path in the front frame of the core engine. Designing a suitable supporting structure therefore requires a high amount of design effort.

The object underlying the present invention is to provide a aircraft gas turbine of the type specified at the beginning, which while being simply designed and easily and cost-effectively producible, is characterized by an optimized design of the stator vane or of the stator vane root, respectively, and avoids the disadvantages of the state of the art in respect of engine length and aerodynamics.

It is a particular object of the present invention to provide solution to the above problematics by a combination of the features described herein. Further advantageous embodiments of the present invention become apparent from the present description.

It is thus provided in accordance with the invention that a vane root of the stator vane is designed as a structural element mounting the core engine, and that the booster bleed duct is provided inside the vane root and issues downstream of the stator vane into the bypass duct.

In accordance with the invention, optimum structural force flow characteristics for mounting of the core engine are thus formed, which are combined with a low-loss flow through the booster bleed duct. To do so, the booster bleed duet integrated into the platform of the stator vane. In a particularly favourable embodiment of the invention, it is provided that the outlet of the booster from the core flow duct (inflow area of the booster bleed duct) is located in front of the front frame in the direction of the engine. The outlet from the booster can be both out of different compressor stages of the booster and downstream of the booster. The air outlet from the booster bleed duct and hence from the platform of the stator vanes into the bypass duct is located downstream of the stator vanes in the direction of the engine.

A design is thus provided in accordance with the invention in which the booster bleed duct intersects the load path for the structural loads in the front frame of the aircraft gas turbine without "cutting" it. This means that the load path can pass undisturbed through the stator vanes and their root areas, and that the booster bleed duct penetrates this area without disrupting the force-transmitting structure.

In a particularly favourable embodiment of the invention, it is provided that the booster deed duct extends substantially in the radial direction in its area adjacent to the booster. Since the structural loads too are introduced substantially in the radial direction and since as a result structural design elements likewise run in the radial direction, the booster bleed duct can be integrated without impairing the structure for suspension of the core engine.

In a preferred embodiment of the invention, a booster bleed duct is provided between each stator vane. This results in a plurality of booster bleed ducts around the circumference of the booster, the number of which ducts matches the number of stator vanes.

In a further favourable development of the invention, it is provided that a downstream-side area of the booster bleed duct in the vane root of the respective stator vane is arranged substantially in the axial direction. It is particularly advantageous here when the booster bleed ducts are each arranged in the interspaces between two adjacent stator vanes. As a result, the force flow through the stator vane into the mounting structure is not interrupted and instead the boaster bleed duct can issue into an area in which reduced structural requirements apply.

In a favourable embodiment of the invention, it can be further provided that at least one part of the axially extending booster bleed duct can be closed to the bypass duct by means of a sealing element. The sealing element can for example be designed in the form of a flat element, for example a sealing plate.

In a particularly favourable embodiment of the invention, it is provided that the vane root of the stator vane, i.e. the load-transmitting structural part of the stator vane, is designed as a cast structure. On the one hand this allows complex geometries to be created in a particularly easy manner and with low weight, and on the other hand cost optimization is possible by using a large number of identical cast elements. It can also be particularly advantageous here in a further development of the invention when several vane roots are each designed as a segment extending in the circumferential direction. Hence it is net required to fit a large number of individual vane roots and stator vanes. Instead, individual segments can be prefabricated and subsequently installed. The stator vanes can thus be produced in accordance with the invention singly, in pairs or in sectors with several integrated stator vanes, or also as a solid ring. A bypass flow wall forming a part of the vane root and a radially inward limitation of the bypass duct can either be integrated into the vane root structure of the stator vanes or designed as a separate component.

Figure 2:
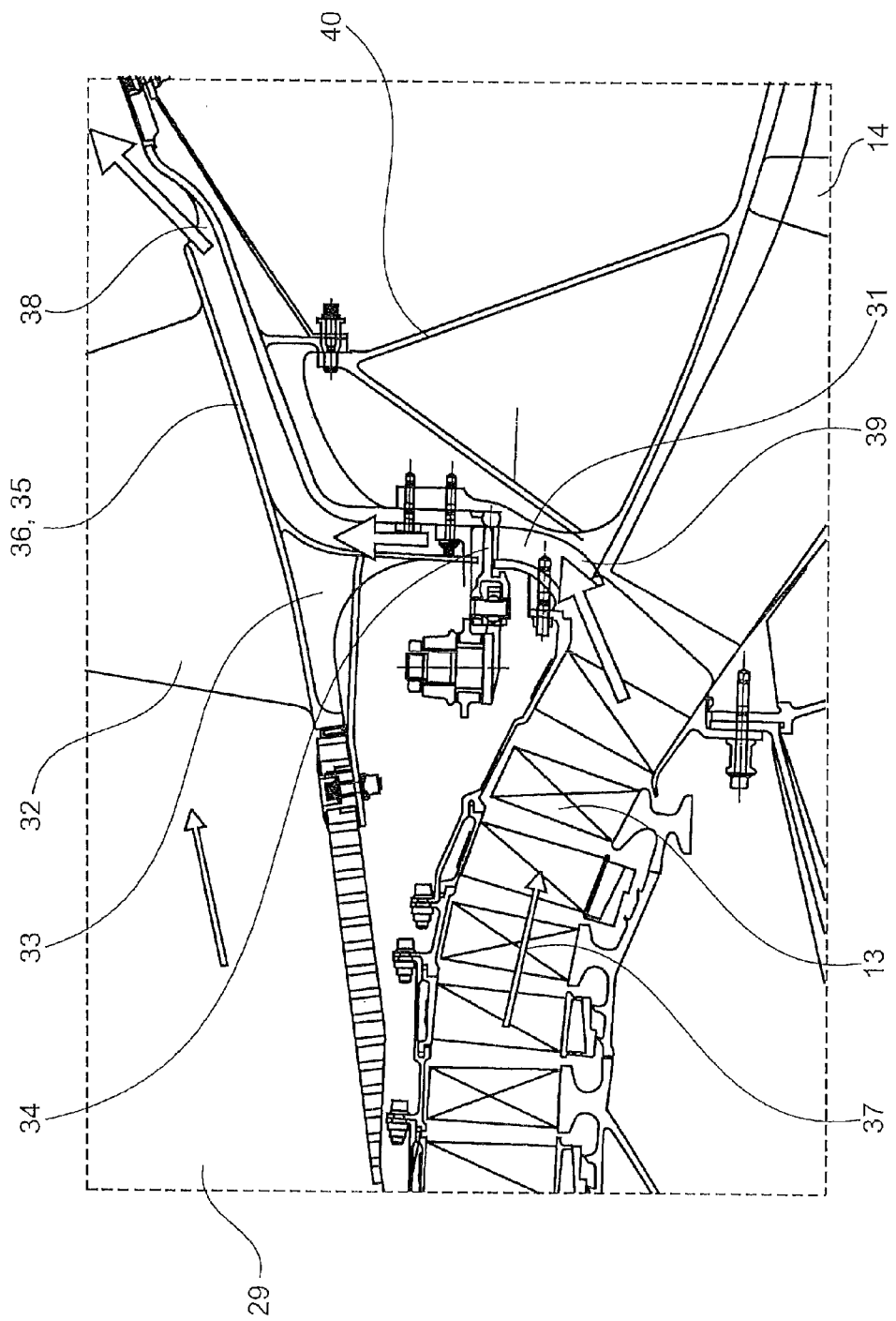
Figure 3:
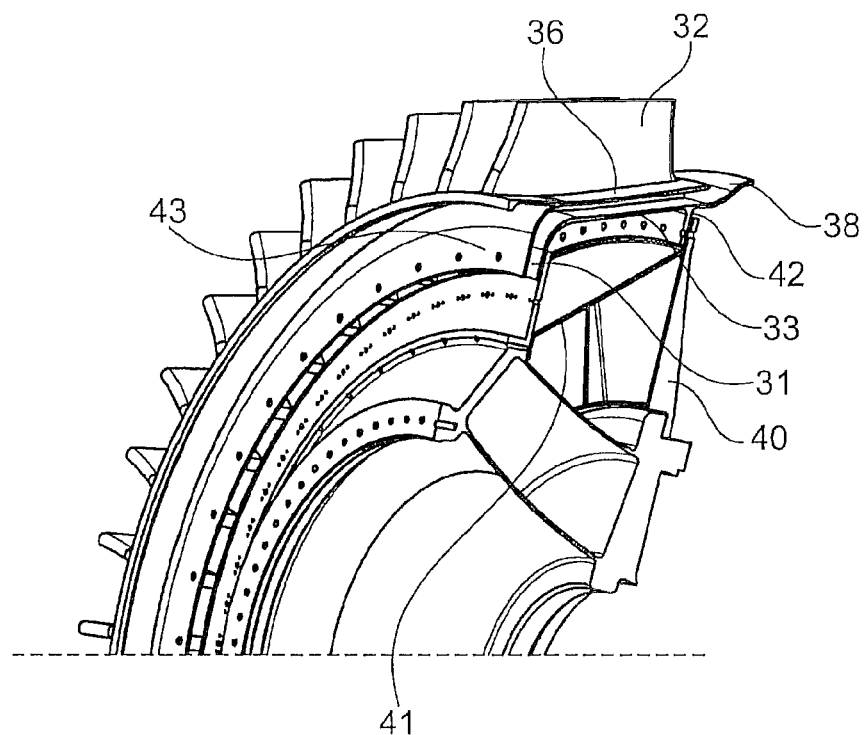
Figure 4:
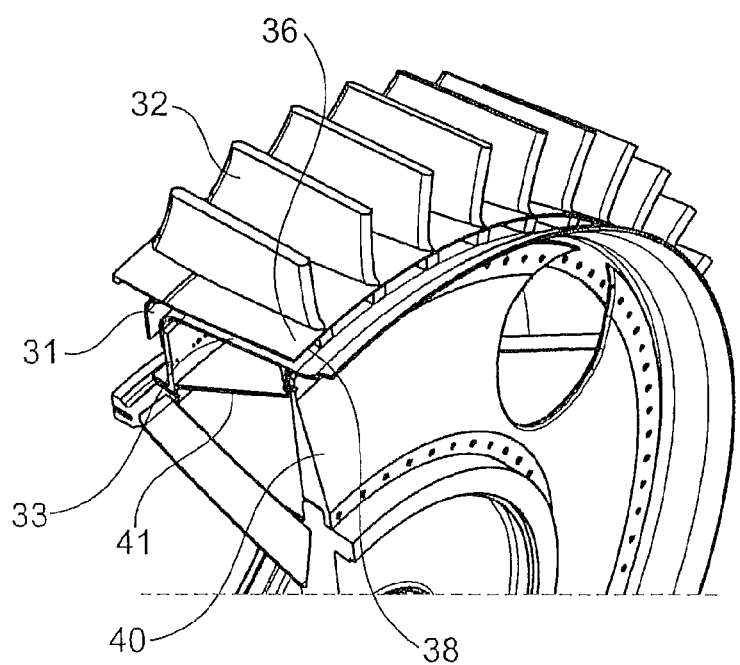
Figure 5:
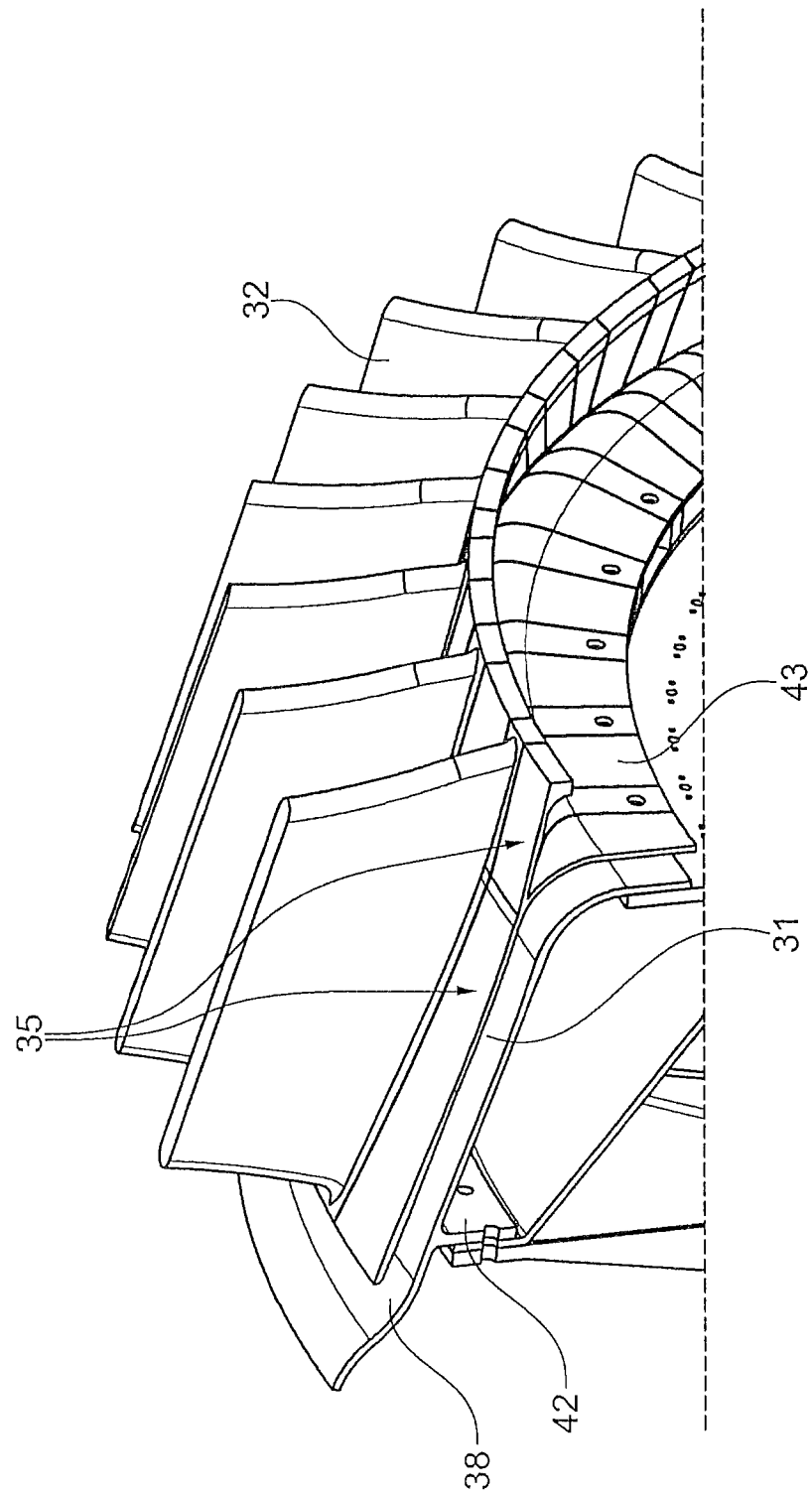

The present invention is described in the following in light of the accompanying drawing showing an exemplary embodiment. In the drawing, FIG. 1 shows a schematic representation of a gas-turbine engine in accordance with the present invention, FIG. 2 shows an enlarged axial partial sectional view of an exemplary embodiment of a vane root area of a stator vane, FIG. 3 shows a perspective partial view of the arrangement as per FIG. 2, FIG. 4 shows a perspective partial view of the embodiments shown in FIGS. 2 and 3, and FIG. 5 shows a further perspective view of the embodiment shown in FIGS. 3 and 4.

The gas-turbine engine 10 in accordance with FIG. 1 is a generally represented example of a turbomachine where the invention can be used. The engine 10 is of conventional design and includes in the flow direction, one behind the other, an it inlet 11, a fan 12 rotating inside a casing, a booster 13, a high-pressure compressor 14, a combustion chamber 15, a high-pressure turbine 16, a low-pressure turbine 18 as well as an exhaust nozzle 19, all of which being arranged about a central engine axis 1.

The booster 13 and the high-pressure compressor 14 each include several stages, of which each has an arrangement extending in the circumferential direction of fixed and stationary guide vanes 20, generally referred to as stator vanes and projecting radially inwards from the engine casing 21 in an annular flow duct through the compressors 13, 14. The compressors furthermore have an arrangement of compressor rotor blades 22 which project radially outwards from a rotatable drum or disk 26 linked to hubs 27 of the high-pressure turbine 16 or the low-pressure turbine 18, respectively.

The turbine sections 16, 18 have similar stages, including an arrangement of fixed stator vanes 23 projecting radially inwards from the casing 21 into the annular flow duct through the turbines 16, 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon rotate about the engine axis 1 during operation.

FIG. 2 shows a detailed axial partial view of a design example of the invention, where a bypass duct 29 is shown through which the bypass flow exiting the fan 12 is routed. Inside the bypass duct 29, a plurality of stator vanes 32 are arranged around the circumference, said vanes guiding the airflow through the bypass duct 29 and additionally acting as structural elements for mounting of the core engine 10. A core flow 37 is shown radially inside the bypass duct 29 and flows through a booster 30. Downstream of the booster 30, inflow openings of a large number of booster bleed ducts 31 distributed over the circumference are provided. The individual booster bleed ducts 31 initially extend substantially in the radial direction. A sealing element 34 (valve) is provided in each booster bleed duct 31, as already known from the state of the art. The individual sealing elements 34 can be combined to form a ring-like component. The booster bleed duct 31 thus extends radially outwards in the direction of the stator vane 32 inside a vane root 33 and then runs in a substantially axial direction parallel to the wall of the bypass duct 29. Downstream of the stator vanes 32, a plurality of outlet openings 38 are provided by which the flow through the booster bleed duct 31 issues into the bypass duct 29. As can be seen in particular from the illustration in FIG. 4, the booster bleed ducts 31 have a substantially rectangular cross-section and extend between the individual stator vanes 32.

In one embodiment the respective vane root 33 of the stator vane 32 is designed as a casting and includes a bypass flow wall 36 which delimits both the vane root 33 radially outwards and the bypass duct 29 radially inwards. In a further embodiment, the vane root 33 of the stator vane 32 is designed as a casting, but the bypass flow wall 35 is designed as a separate component, which can take the form of a ring or ring segment.

The exemplary embodiment shows that the vane root 33 is connected to mounting elements 40 and 41. This can be achieved by the fitting of separate mounting elements or by a one-piece design of the vane root 33 in the form of a cast structure.

As can be seen from FIG. 5 in particular, an integral design is thus created in accordance with the invention in which the loads introduced via the stator vanes can be transmitted via the vane root to the core engine, where the individual booster bleed ducts 31 are integrated into the overall structure and do not impair the force flow characteristics. To do so, the vane root is provided with annular flanges 42 (rear annular flange) and 43 (front annular flange) designed in particular in one piece with said vane root and used for assembly and force transmission.

The individual stator vanes 32 can be designed singly or as a ring or as a ring segment. The booster bleed duct 31 itself forms in any event a part of the structural element of the vane root 33.

LIST OF REFERENCE NUMERALS

1 Engine axis
10 Gas-turbine engine/core engine
11 Air inlet
12 Fan
13 Booster
14 High-pressure compressor
15 Combustion chamber
16 High-pressure turbine
18 Low-pressure turbine
19 Exhaust nozzle
20 Guide vanes
21 Engine casing
22 Compressor rotor blades
23 Stator vanes
24 Turbine blades
26 Compressor drum disk
27 Turbine rotor hub
28 Exhaust cone
29 Bypass duct
30 Booster
31 Booster bleed duct
32 Stator vane/Stator vane row
33 Vane root
34 Sealing element/valve
35 Sealing element/cover element
36 Bypass flow wall integral in vane root
37 Core flow
38 Outlet opening
39 Inlet opening
40 Mounting element
41 Mounting element
42 Annular flange
43 Annular flange

The invention claimed is:
1. An aircraft gas turbine comprising:
a core engine including an inflow zone;
a bypass duct surrounding the core engine;

the core engine including a booster in the inflow zone;

a booster bleed duct for supplying an airflow from the booster into the bypass duct;

a stator vane row including a plurality of stator vanes arranged in the bypass duct downstream of a fan and including a vane root;

wherein the vane root is a structural element mounting the core engine, and wherein the booster bleed duct is positioned inside the vane root and issues downstream of the stator vane row into the bypass duct;

wherein the booster bleed duct includes an inlet positioned at the booster to open to an interior of the booster to bleed fluid from the booster, a leading edge of the inlet positioned at the booster at an axial position aft of a forward edge of the stator vane row, wherein the booster bleed duct extends primarily in a radial direction from an area adjacent to the booster to a bypass flow wall, the booster bleed duct then extending primarily in an axial direction along at least one chosen from the bypass flow wall and a sealing element forming part of the bypass flow wall until issuing downstream of the stator vane row into the bypass duct.

2. The aircraft gas turbine in accordance with claim 1, wherein the stator vane row includes a plurality of vane roots, which are attached together as a segment extending in a circumferential direction.

3. The aircraft gas turbine in accordance with claim 1, and further comprising a plurality of booster bleed ducts, with one of the plurality of booster bleed ducts positioned between each stator vane of the plurality of stator vanes.

4. The aircraft gas turbine in accordance with claim 1, and further comprising a sealing element covering at least one part of the axially extending booster bleed duct towards the bypass duct.

5. The aircraft gas turbine in accordance with claim 1, wherein the plurality of stator vanes are structural elements mounting the core engine.

6. The aircraft gas turbine in accordance with claim 1, wherein the vane root is a cast structure.

7. The aircraft gas turbine in accordance with claim 1, wherein the vane root includes at least one sealing element associated with the booster bleed duct.

\* \* \* \* \*